United States Patent

[11] 3,628,570

[72] Inventor Allen Richard Andis
 3209 Elwood Drive, Racine, Wis. 53406
[21] Appl. No. 91,277
[22] Filed Nov. 20, 1970
[45] Patented Dec. 21, 1971

[54] OMNIDIRECTIONAL FLUID-CONTROL VALVE
 4 Claims, 15 Drawing Figs.

[52] U.S. Cl. ........................................... 137/625.23
[51] Int. Cl. ........................................... F16k 11/02
[50] Field of Search .......................... 137/625.22,
 625.23, 625.21, 625.46, 625.47; 251/315

[56] References Cited
 UNITED STATES PATENTS
2,613,908 10/1952 Palen ........................... 137/625.22
2,911,009 11/1959 Parker .......................... 251/315 X
3,313,317 4/1967 Mosier ......................... 137/625.46
3,370,612 2/1968 Holl ............................. 251/315 X
3,545,487 12/1970 Kinner ......................... 137/625.21 X Primary Examiner—M. Cary Nelson
Assistant Examiner—Robert J. Miller
Attorney—Axel H. Johnson ABSTRACT: A fluid-control valve having a spherical control member surrounded by a body having a chamber that conforms intimately with the surface of the control member. Fluid passageways are provided on the control member which are alignable with ports in the body when the member is nutated relative to the chamber. Fluid under pressure is thus selectively directed to hydraulic equipment to actuate a ram or other device.

PATENTED DEC 21 1971

INVENTOR
ALLEN RICHARD ANDIS

BY

Axel H. Johnson,
AGT.

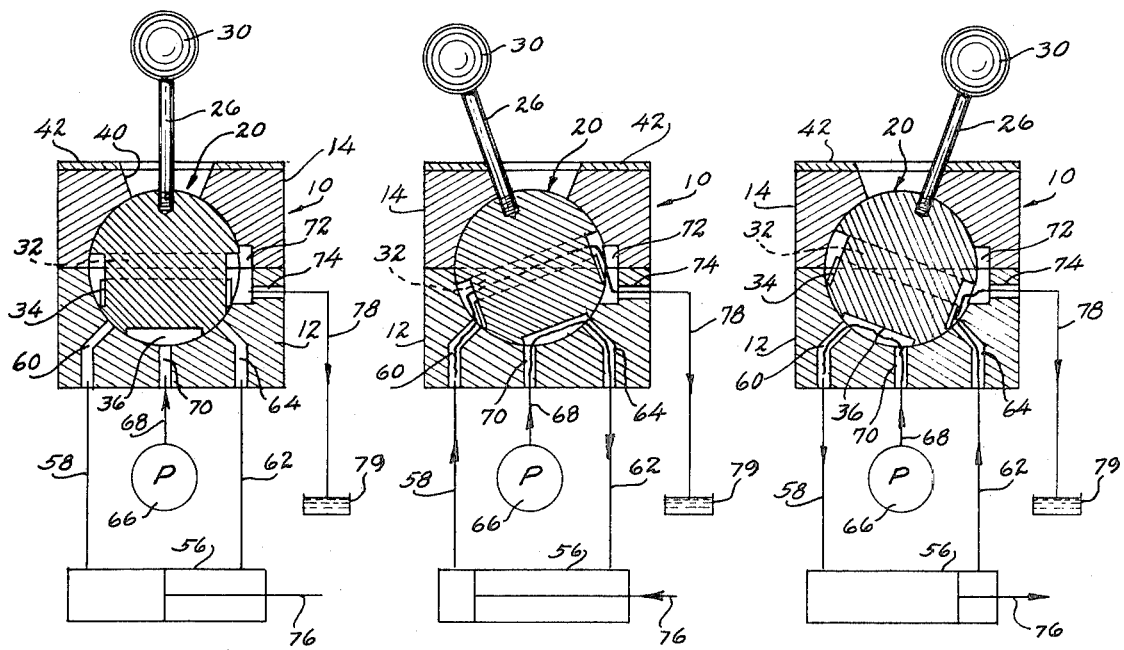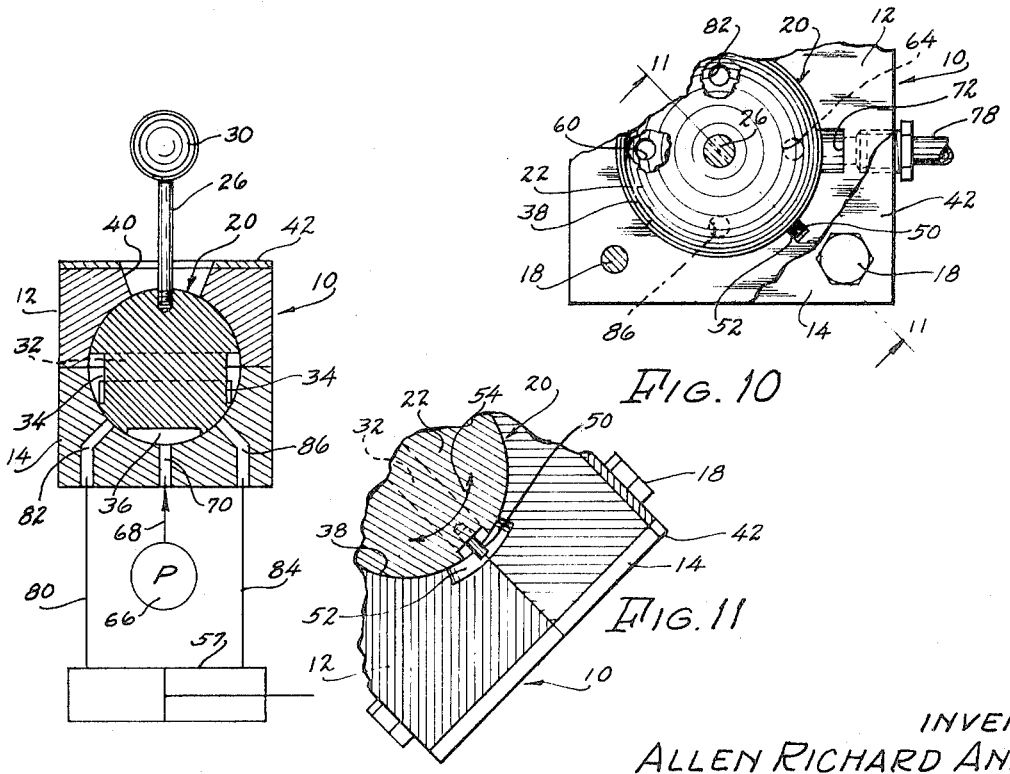

OMNIDIRECTIONAL FLUID-CONTROL VALVE

BACKGROUND OF THE INVENTION

1. Field of the Invention

This invention relates to a valve for hydraulic systems that permits selective control of one or more hydraulic rams or similar equipment.

2. Description of the Prior Art

The prior art generally comprises valves having sliding spools provided with axially spaced circumferential reductions in diameter which serve to "valve" fluid into various passageways upon axially shifting of the spools.

SUMMARY OF THE INVENTION

This invention comprises a hydraulic valve, the gist of which comprises a control member having a spherical contour and which is substantially surrounded by a body portion in intimate spherical contact therewith. The control member can be peripherally rotated or nutated relative to the body portion by means of a handle. The control member is provided with a circumferential passageway and a plurality of circumferentially spaced passageways which are selectively positionable so as to permit fluid to be directed to operate the desired cylinder or ram. An object of this invention is to provide a control valve that operates in a plurality of directions by nutating the handle thereof.

Another object is to provide a valve having ports that permit operating a plurality of fluid-actuated devices from one control unit.

Further objects and advantages of this invention will become apparent from a consideration of the following detailed description taken in connection with the accompanying drawings wherein an embodiment of the invention is shown. It is however, to be understood that the invention is not limited to the details disclosed, but includes all such variations as fall within the spirit of the invention.

Referring to the drawings:

FIG. 10 is a plan view of the valve with a portion broken away to show the ports, and the means of limiting rotation of the control member.

FIG. 11 is a section taken at 11—11 of FIG. 10.

FIG. 12 through 14 are diagrammatic and illustrate the functions of the valve and ram at various positions of the control member in the plane of FIG. 2.

FIG. 15 is diagrammatic and illustrates the functions of the valve and ram in the plane 15—15 of FIG. 1, and showing the system inactive or "blocked."

Figure 1:
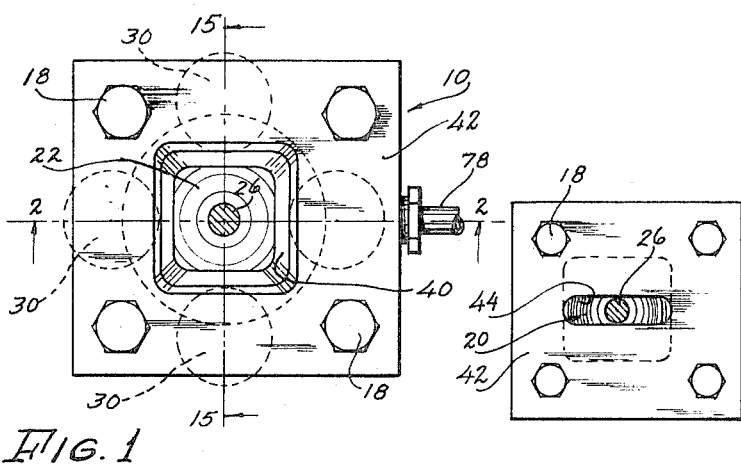
FIG. 1 is a plan view of a typical valve embracing this invention.
Figure 4:
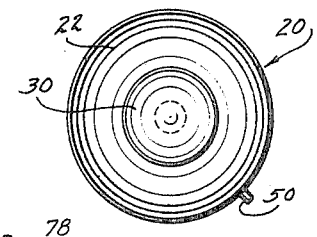
FIG. 4 is a top view of the spherical control member.

The valve in this instance, comprises a body portion 10 of the form shown, and which comprises a lower portion 12 and upper portion 14. These portions have plane mating surfaces as at 16 which are machined to provide a leakproof seal. Bolts 18 are provided to secure portions 12 and 14 together.

The control member 20 comprises a sphere member 22 preferably of metal, with a central point 24. A handle 26 is secured in member 22 by a threaded portion or by other suitable means, and is defined by an axis 28 which passes through central point 24. A ball 30 provides a convenient means of operating the valve. A circumferential open primary passageway 32 extends about the periphery of spherical member 22, normal to axis 28, and which passageway is positioned substantially at the maximum diameter of the sphere 22. A plurality of circumferentially positioned secondary passageways 34, 4 in this instance, are provided at 90° apart, the functions of which will be later explained. A lower passageway 36 is provided at the bottom of sphere 22 normal to the axis 28 and of the shape shown.

Lower and upper portions 12 and 14 respectively have a mutual spherical chamber 38 which is machined accurately to conform to the contour of the sphere 22, and to permit the latter to rotate freely therein. Portion 14 is provided with an upper opening 40 of the shape shown. Handle 26 is positioned so as to move to various positions within opening 40 as the control member 20 is nutated. A guide plate 42 is positioned as shown, with an opening in this instance conforming to the opening 40. Plate 42 can also be optionally provided with other openings such as 44 and 46 for various control situations, and shown in FIGS. 8 and 9. An O-ring seal 48 is provided in the spherical chamber 38 of the upper portion 14 to assure a fluid seal about the sphere 22. In this instance it is necessary to prevent rotation of the control member 20 about the axis 28. This is accomplished by providing a pin 50 in spherical member 22 as shown. Pin 50 travels in a slot 52 machined in portions 12 and 14 as shown in FIGS. 10 and 11 in the direction indicated by arrow 54. Control member 20 is otherwise free to "nutate" in any direction except as limited by the opening 40 or those shown in FIGS. 8 and 9.

Figure 2:
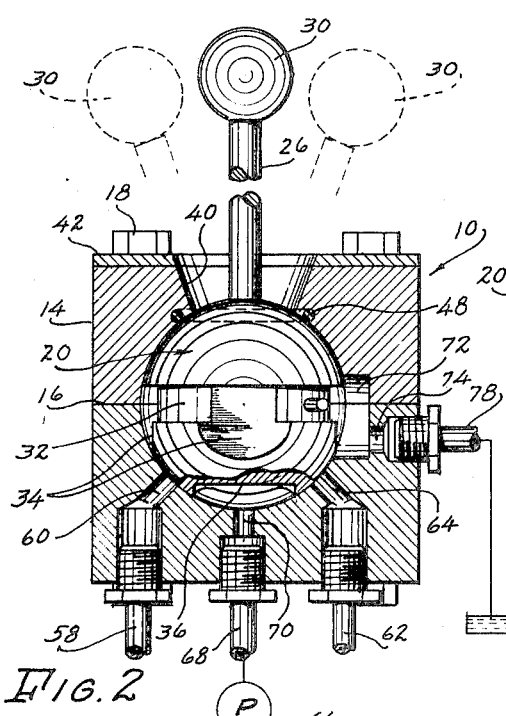
FIG. 2 is a section taken at 2—2 of FIG. 1, and in the "blocked" position.

In this instance provision is made to operate a pair of double-acting rams or cylinders 56 and 57. FIGS. 12 through 14 shown the hydraulic connections between the ram 56 and the control valve, and conform to sectional view in FIG. 2. A fluid supply line 58 extends to a port 60, and supply line 62 extends to a port 64. A pump 66 of a suitable type supplies fluid under pressure through supply line 68 into port 70.

Body portion 10 has provided therein a cavity 72 opening into an outlet port 74. The valve, as shown in FIG. 12 is in a "blocked" or closed position, with no fluid flowing. When handle 26 is moved to the position shown in FIG. 13, fluid flows through port 70 into passageway 36, out through port 64 and through line 62 to ram 56, thus moving rod 76 in the direction of the arrow. Fluid will then flow through line 58, into port 60 and around passageway 32, escape through outlet port 74 and through line 78 to a sump or reservoir 79. When handle 26 is moved to the position shown in FIG. 14, fluid will flow through port 70 into passageway 36, out through port 60 and through line 58 to ram 56, thus moving rod 76 in the direction of the arrow. Fluid will then flow through line 62 into port 64, and out through return port 74 and line 78 to the sump or reservoir 79.

Ram 57, shown in FIG. 15, is controlled in the same manner as described with respect to ram 56, the handle 26 being moved in a direction at right angles to that when actuating ram 56. In this instance, line 80 is connected to port 82, and line 84 is connected to port 86. The control of ram 57 is otherwise identical with that of ram 56.

Figure 9:
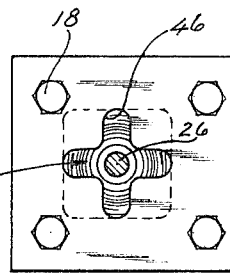
FIG. 9 is similar to FIG. 8, but in which the aperture limits the operation of the valve to one plane.
Figure 5:
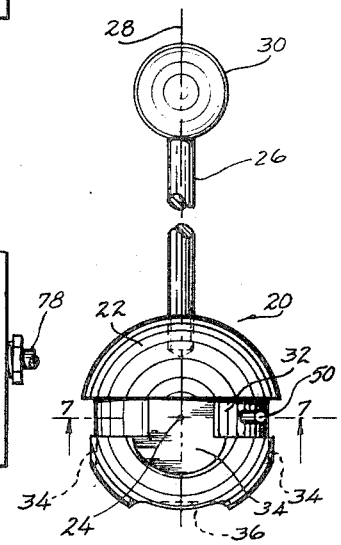
FIG. 5 is an elevational view of the control member.
Figure 3:
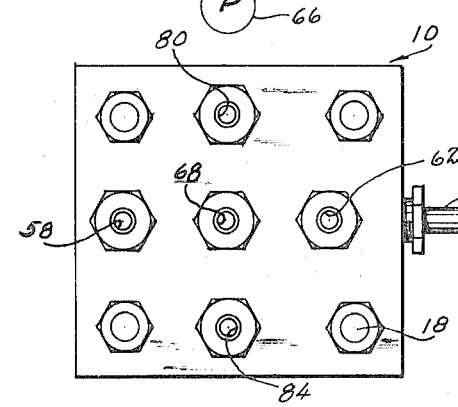
FIG. 3 is a bottom view of the valve.
Figure 8:
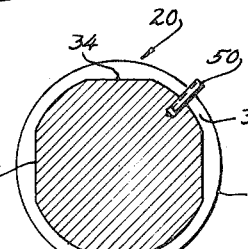
FIG. 8 is a plan view of the valve having an apertured cam plate to permit operation of the valve in planes at right angles to each other.
Figures 6, 7:
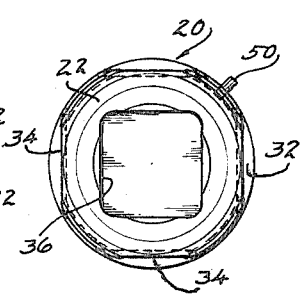
FIG. 6 is a bottom view of the control member.
FIG. 7 is a section taken at 7—7 of FIG. 5.

When the valve is arranged to selectively actuate either ram 56 or 57, the plate 42 will have an opening 46 as shown in FIG. 8. If only one ram is in the system, the plate 42 can have an opening 44 as shown in FIG. 9, thus limiting the handle 26 to movement or nutation in one plane. However, in the absence of plates 42, the handle 26 is not so limited. With respect to FIG. 1, the handle is limited to nutation only by the contour of opening 40.

The above being a complete description of an illustrative embodiment of the invention, what is claimed as new and desired to be secured by Letters Patent of the United States is:

1. A fluid control valve having a body and a control member, said control member comprising a sphere rotatable within said body and defined by a central point, a primary peripherally open passageway encircling said sphere, a plurality of discrete peripherally spaced secondary passageways opening into said primary passageway and directed peripherally and downwardly therefrom, a lower passageway on the surface of said sphere, discrete from said secondary passageways and symmetrical with an axis normal to said primary passageway and passing through said central point, said body having a chamber intimately surrounding said sphere and permitting rotation thereof, said body having a plurality of ports for the flow of fluid opening into said chamber, and an outlet fluid port, said ports permitting fluid to flow into said lower passageway and to be directed selectively into said secondary passageways so as to flow about said primary passageway and through said outlet port upon nutation of said control member.

2. A fluid control valve as set forth in claim 1, in which said body is defined by an upwardly directed opening in said chamber, a handle integral with said sphere, defined by said axis and extending upwardly through said opening.

3. A fluid control valve as set forth in claim 2, in which means is provided integral with said sphere to engage said body to prevent rotation of said sphere about said axis, but permit nutation of said sphere relative to said chamber.

4. A fluid control valve as set forth in claim 3, in which said means comprises a projecting member integral with said sphere which engages a slot in the wall of said chamber.

* * * * *